US010013874B2

(12) United States Patent
Tiberi et al.

(10) Patent No.: US 10,013,874 B2
(45) Date of Patent: Jul. 3, 2018

(54) INTERACTION DETECTION WEARABLE CONTROL DEVICE (71) Applicant: PHILIPS LIGHTING HOLDING B.V., Eindhoven (NL)

(72) Inventors: Luca Tiberi, Eindhoven (NL); Paul Anthony Shrubsole, Eindhoven (NL); Maurice Herman Johan Draaijer, Eindhoven (NL); Ralf Gertruda Hubertus Voncken, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/112,406

(22) PCT Filed: Sep. 23, 2015

(86) PCT No.: PCT/EP2015/071808
§ 371 (c)(1),
(2) Date: Jul. 18, 2016

(87) PCT Pub. No.: WO2016/050572
PCT Pub. Date: Apr. 7, 2016

(65) Prior Publication Data
US 2017/0263113 A1 Sep. 14, 2017

(30) Foreign Application Priority Data
Sep. 29, 2014 (EP) .................................... 14186799

(51) Int. Cl.
G08C 17/02 (2006.01)
G06T 7/70 (2017.01)
(Continued)

(52) U.S. Cl.
CPC ......... G08C 17/02 (2013.01); G06K 7/10396 (2013.01); G06K 7/1417 (2013.01);
(Continued)

(58) Field of Classification Search
CPC ................ G08C 17/02; G08C 2201/93; G08C 2201/30; G08C 2201/20; G08C 2201/92;
(Continued)

(56) References Cited

U.S. PATENT DOCUMENTS 8,068,011 B1 11/2011 Sajadi et al.
9,229,227 B2 * 1/2016 Border ............... G02B 27/0093
(Continued)

FOREIGN PATENT DOCUMENTS

DE 102006047568 A1 4/2008
WO 2011011746 A1 1/2011

OTHER PUBLICATIONS http://www.dailymail.co.uk/sciencetech/article-2572820/The-Bluetooth-ring-turns-finger-MAGIC-WAND.html.
(Continued)

Primary Examiner — Mark Blouin (57) ABSTRACT

A wearable device 100 for controlling a controllable device 104 based on an interaction with an object 102 is disclosed. The wearable device 100 comprises a device detection unit 106 for detecting proximity of the object 102, an action detection unit 112 for detecting an action indicative of an interaction of a user wearing the wearable device 100 with the object 102 and a processing unit 108 for generating a control command for controlling the controllable device 104 based on the detected proximity of the object 102 and based on the action indicative of an interaction with the object 102. The wearable device 100 further comprises a communication unit 110 for sending the control command to the controllable device 104. Thereby, the wearable device 100 is able to detect the use of the object 102 and adjust the control parameters of the controllable device 104 to create context-related use conditions. This may improve the control of the controllable device 104 and this may offer new interaction
(Continued)

possibilities between the wearable device 100, the controllable device 104 and the object 102.

11 Claims, 4 Drawing Sheets

(51) Int. Cl.
*G06K 7/10* (2006.01)
*G06K 7/14* (2006.01)
*G06K 19/07* (2006.01)
*H04N 7/18* (2006.01)

(52) U.S. Cl.
CPC ............ *G06K 19/0723* (2013.01); *G06T 7/70* (2017.01); *H04N 7/183* (2013.01); *G08C 2201/32* (2013.01); *G08C 2201/40* (2013.01); *G08C 2201/91* (2013.01); *G08C 2201/93* (2013.01)

(58) Field of Classification Search
CPC . G08C 23/04; G08C 2201/32; G08C 2201/70
USPC ........................................................ 340/12.5
See application file for complete search history.

(56) References Cited

U.S. PATENT DOCUMENTS

| | | |
|---|---|---|
| 2010/0156676 A1 | 6/2010 | Mooring et al. |
| 2013/0300316 A1 | 11/2013 | Engel-Hall et al. |
| 2014/0176809 A1 | 6/2014 | Chen |
| 2014/0266757 A1 | 9/2014 | Luna |

OTHER PUBLICATIONS http://www.consumerlab.es/nod-gesture-control-ring/.
Brian D. Mayton et al, "WristQue: A Personal sensor Wristband", MIT of Technology Media Lab.

* cited by examiner

Fig. 4b

INTERACTION DETECTION WEARABLE CONTROL DEVICE

CROOS-REFERENCE TO PRIOR APPLICATIONS

This application is the U.S. National Phase application under 35 U.S.C. § 371 of International Application No. PCT/EP2015/071808, filed on Sep. 23, 2015, which claims the benefit of European Patent Application No. 14186799.4, filed on Sep. 29, 2014. These applications are hereby incorporated by reference herein.

FIELD OF THE INVENTION

The invention relates to a wearable device for controlling a device.

BACKGROUND OF THE INVENTION

Wearable user interfaces, e.g. Smart bracelets and smart rings, are being released in the market. These devices are designed to be always with the user and may be connected to a smartphone or a tablet. These devices provide new paradigms for interaction with smart devices because of the capability to detect gestures and movements of the wearer via integrated MEMS sensors (e.g. an accelerometer and a gyroscope). Other sensors that can be integrated provide the possibility for user input via, for example, touch-sensitive sensors, buttons or touchscreens. Furthermore, these devices are able to connect to other devices (e.g. via Bluetooth or ZigBee) and/or to the internet (e.g. via WiFi). Published patent application WO 2011011746 A1 discloses a wearable computing device comprising sensors for detecting gestures, for identifying commands from the gestures and for transmitting the commands to an electronic consumer device.

U.S. Pat. No. 8,068,011 B1 relates to systems and methods for interactively interfacing handheld devices and RFID. The method includes starting an application on a HHD for interfacing with RFID media, the HHD including a RFID reader, receiving user input relating to the storing of commands or messages of RFID media, creating one or more commands or messages based on the received user input, and storing the one or more commands or messages on a RFID media using the RFID reader.

DE 10 2006 047568 A1 relates to an identification mechanism of a control device which receives and identifies control functions for electrical devices for a user of the control device either directly from the electrical devices or through a central switching unit. The control device has an indicator to show the electrical device that can be controlled. The identification mechanism radiates identification signals through a transceiver mechanism to the electrical device or receives an identification of the selected electrical device that is indicated to the user.

U.S. patent application 2014/0266757 A1 relates to a media devices, which may include a plurality of RF transceivers, an audio system, and a proximity detection system. The RF transceivers and/or audio system may be used to wirelessly communicate between media devices and allow configuration and other data to be wirelessly transmitted from one media device to another media device. The proximity detection system may be configured to detect a presence of a user or multiple users and upon detecting presence, take some action defined by a user preference and/or environmental conditions around the media device. One or more user devices in proximity of the media device post detection may wirelessly communicate with the media device and the media device may orchestrate handling of content from those devices or from a wirelessly accessible location such as the Cloud or Internet.

SUMMARY OF THE INVENTION

It is an object of the present invention to provide further control options for controlling devices by means of wearable devices.

According to a first aspect of the present invention the object is achieved by a wearable device for controlling a controllable device based on an interaction with an object. The wearable device comprises:
- a device detection unit for detecting proximity of the object,
- an action detection unit for detecting an action indicative of an interaction of a user wearing the wearable device with the object,
- a processing unit for generating a control command for controlling the controllable device based on the detected proximity of the object and based on the action indicative of an interaction with the object, and
- a communication unit for sending the control command to the controllable device.

The wearable device provides the advantage that it is able to assess context-related conditions by detecting the presence of the object and adjust control parameters of the controllable device. The adjustable control parameters of the controllable device depend on the type of controllable device, which may be any device with adjustable control parameters. The control command that is generated by the processing unit is related to the control parameters of the controllable device.

The wearable device further comprises an action detection unit for detecting an action indicative of an interaction of a user wearing the wearable device with the object, and the control command may be further based on the action indicative of an interaction with the object. The action indicative of an interaction may comprise, for example, the grabbing, unlocking/opening, switching on or repositioning of the object by a movement of the user. The information from the action detection unit is received by the processing unit, thereby providing the processing unit with information about the interaction in order to determine the use of the object. The action detection unit may comprise movement detection sensors (e.g. an accelerometer and/or a gyroscope), thereby allowing detection of movement (e.g. picking up a device, tapping a device) of the user wearing the wearable device. The control command may be further based on the interaction of the user with the object.

In an embodiment the device detection unit of the wearable device is further arranged for detecting an identification tag of the object, and the control command may be further based on an identification of the object. The identification tag may be, for example, a radio frequency detectable tag. If the object does not comprise an identification tag at manufacture, the user may be able to apply such a tag to the object as a retrofit solution, thereby allowing detection and identification of the object by the detection unit of the wearable device. It is advantageous to use such tags because these may be applied to any object without altering its hardware or software.

Additionally or alternatively, the device detection unit of the wearable device may comprise a wireless transceiver arranged for communicating with the object for obtaining a characteristic of the object, and the control command may be further based on the characteristic of the object. A communication link between the object and the wearable device provides a further advantage of receiving information on user (inter)action events with the object and/or user input on the object without the wearable device detecting these (inter)action events and/or user inputs, thereby enabling the adjusting of the controllable device further based on this communication. For example, if the user provides user input on the object, an adjusted control command may be sent to the controllable device in order to adjust a setting of the controllable device based on new 'use conditions' associated with the user input on the object. Various wireless communication protocols may be used, for example Bluetooth, Wi-Fi or ZigBee.

In an embodiment the wearable device further comprises a memory for storing a user preference setting related to controlling the controllable device, and the processing unit is arranged for generating the control command for controlling the controllable device based on the user preference setting. The user preference setting may be uploaded to the memory, for example via wireless communication or via a user interface of the wearable device. The memory may further be arranged for storing information about a characteristic of one or more controllable devices and/or a characteristic of one or more objects. This information may be used by the processing unit to further identify the controllable device and/or the object and to generate the control command based on this further device identification.

In an embodiment the device detection unit of the wearable device further comprises a camera for capturing an image of at least a part of the object, and the processing unit is further arranged for identifying the object based on the image. Image content recognition methods (e.g. content-based image retrieval) may be used to identify an object without communicating with the object. Additionally or alternatively, the camera may be arranged for reading a quick response (QR) code attached to the object. An advantage of QR codes is that these can be applied to any object without altering the hardware or software of the object and hence can be used to retrofit or upgrade any object to be compatible with a system and/or method as described in the present disclosure.

In embodiments the communication unit of the wearable device may be arranged for sending the control command to the controllable device through an intermediate communication device. The intermediate communication device may function as a bridge between the wearable device and one or more controllable devices. The intermediate communication device may store one or more preset control commands and/or user preference settings. The use of an intermediate communication device may be advantageous in that it may also provide an interface platform between the wearable device and a plurality of controllable devices, thereby eliminating the requirement of the wearable device to be able to communicate with all of the plurality of different controllable devices. Furthermore, the intermediate communication device may be connected to the internet, allowing sending control commands to remote controllable devices.

In an embodiment the wearable device comprises a user interface arranged for receiving a user input, and the processing unit may be further arranged for processing the user input received from the user via the user interface. The user input may for example comprise a selection and/or a confirmation of selection of the object detected by the wearable device, thereby allowing the user to acknowledge the detection of the object. The user input may comprise a selection and/or a confirmation of selection of the controllable device, thereby allowing the user to acknowledge a connection with the controllable device. The user input may comprise a user preference setting for the controllable device. The user input may comprise an adjustment and/or a creation of a control command for the controllable device. The user interface may comprise a touch-sensitive device such as a touchpad or a touchscreen, an audio sensor such as a microphone, a motion sensor such as an accelerometer and/or a gyroscope for detecting gestures and/or one or more buttons for receiving the user input. The user interface may for example allow a user to acknowledge or overrule a control command, generated by the processing unit, for the controllable device or set user preferences for controlling the controllable device.

According to a second aspect of the present invention the object is achieved by a method of controlling a controllable device based on an interaction with an object. The method comprises the steps of:
  providing a wearable device,
  detecting proximity of the object to the wearable device,
  detecting an action indicative of an interaction of a user wearing the wearable device with the object,
  generating a control command for controlling the controllable device based on the proximity detection of the object to the wearable device and based on the action indicative of interaction of a user with the object, and
  sending the control command to the controllable device.

Further disclosed is a set comprising a wearable device as described above and a programming device adapted to connect to the wearable device through a wired or wireless connection and arranged to configure the wearable device. The programming device may comprise a user interface arranged for receiving a user input, thereby allowing a user to set a user preference setting for the wearable device and/or to adjust or create a control command for the wearable device. An advantage of using a programming device to configure the wearable device is that it may reduce the complexity of a user interface of the wearable device or even make such a user interface superfluous, thereby reducing the costs of the wearable device.

BRIEF DESCRIPTION OF THE DRAWINGS

The above, as well as additional objects, features and advantages of the disclosed devices and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
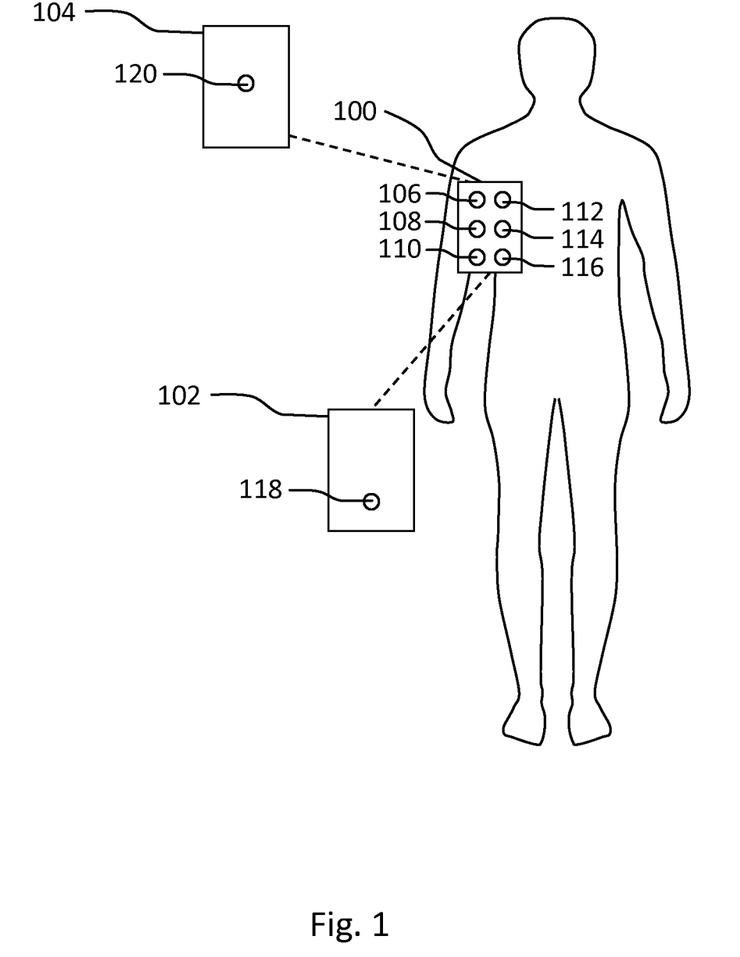
FIG. 1 shows schematically an embodiment of a wearable device according to the invention for controlling a controllable device based on an interaction with an object.

FIG. 1 shows schematically an embodiment of a wearable device 100 according to the invention for controlling a controllable device 104 based on an interaction with an object 102. The wearable device 100 comprises a device detection unit 106 arranged for detecting proximity of the object 102, a processing unit 108 for generating a control command for controlling the controllable device 104 based on the detected proximity of the object 102 and a communication unit 110 for sending the control command to the controllable device 104. The wearable device may further comprise a battery (not shown) for powering the different components in the wearable device 100. In the embodiment of FIG. 1, the wearable device 100 may be any suitable wearable device 100. The type of wearable device 100 (e.g. a bracelet, a ring, glasses, gloves, pendants, etc.) may be selected in relation to the context wherein the wearable device 100 will be used. The envisioned interaction options with the object 102 may determine the selection of a specific wearable device 100. For example, an intended use of the object 102 at a distance from the user (e.g. watching television) requires different proximity detection means than when the object 102 is intended to be used nearby (e.g. reading an e-book on an e-book reader). In an exemplary embodiment the wearable device 100 may be a bracelet, the object 102 may be an e-book reader and the controllable device 104 may be a lighting device. In this embodiment the device detection unit 106 of the bracelet detects the proximity of the e-book reader. The processing unit 108 receives information about the proximity of the e-book reader. This allows the processing unit to generate a control command, the control command comprising a lighting setting suitable for the use of the e-book reader, which is sent to the lighting device via the communication unit 110 of the bracelet, thereby providing a lighting setting adapted for using the e-book reader. In another embodiment, the wearable device 100 may be smart glasses comprising a detection unit 106 arranged for eye tracking (i.e. measuring the point of gaze of the user and/or the motion of an eye relative to the head of the user). This allows the detection unit 106 of the smart glasses to determine the intended use of an object 102 (e.g. watching television).

The device detection unit 106 of the wearable device 100 is arranged for detecting proximity of the object 102. Therefore, the object 102 needs to be detectable by the device detection unit 106 of the wearable device 100. The object 102 may, for example, be equipped with a radio frequency identification (RFID) tag which may be detectable by an RFID reader at the wearable device 100. However, the object 102 may be equipped with any other detectable means 118 or have properties or characteristics which may be detected by the detection unit, for example by a camera, as will be described in more detail later on in the description.

The processing unit 108 of the wearable device 100 is arranged for generating a control command based on the information it receives from the device detection unit 106. The information received from the device detection unit 106 comprises proximity of the object 102 and some identification of the object 102. The identification of the object 102 may for example comprise information about the type of object 102, thereby allowing the estimation of an intended use or intended user action with the object 102. This may enable the processing unit 108 to generate a control command for the controllable device 100 suited for use of the object 102 by the user. In an exemplary embodiment the object 102 may be a hairdryer which may, after being detected by the device detection unit 106, be identified by the processing unit 108 as a hairdryer, which allows the processing unit 108 to determine an intended use (i.e. drying hair). This enables the processing unit 108 to generate a control command for a controllable device 104 suited for the use of a hairdryer. In this exemplary embodiment the controllable device 104 may be, for example, a lighting system which may receive a control command to set lighting conditions suitable for drying hair. A further controllable device 104, for example a smart mirror with a display function, may also receive a control command from the wearable device 100 to set display conditions for drying hair.

The communication unit 110 of the wearable device 100 comprises a transmitter to send the control command to the controllable device 104. The controllable device 104 may comprise a receiver 120 for receiving the control command. In another embodiment the transmitter 106 of the wearable device 100 and the receiver 120 from the controllable device 104 may be transceivers, allowing bidirectional communication between the wearable device 100 and the controllable device 104. An advantage of bidirectional communication may be that the controllable device 104 may provide information for the wearable device 100. For example, when the controllable device 104 is a thermostat that receives a control command to set the temperature in a room, the transceiver may send information about the current temperature to the wearable device 100 and, optionally, communicate this information to the user.

In a further embodiment the wearable device 100 further comprises an action detection unit 112 arranged for detecting an action indicative of an interaction of a user wearing the wearable device 100 with the object 102, and wherein the control command is further based on the action indicative of an interaction with the object 102. An advantage of the action detection unit 112 is that it may allow the processing unit 108 to further determine, based on the interaction, the intended use of the object 102. In an exemplary embodiment the action detection unit 112 may comprise a motion sensor (e.g. an accelerometer and/or a gyroscope), and the action indicative of an interaction may comprise a movement of the user (e.g. a gesture) and therewith also a movement of the wearable device 100 worn by the user. The processing unit 108 may be further arranged for identifying the movement and for adjusting the control command based on the movement. The movement may be, for example, playing on an (electric) piano, which may be detected by the wearable device 100, which may be, for example, a smart ring. The processing unit 108 of the smart ring may identify the movement as playing the (electric) piano and may send a control command to a controllable device 104, for example a television, commanding it to reduce its volume. In a further exemplary embodiment the action detection unit 112 may further comprise an audio sensor (e.g. a microphone), thereby allowing the detection of sound (e.g. speech detection and/or recognition of the acoustic signature of turning a switch on the object 102 or the sound of the object 102 starting up). In the previous example of playing the (electric) piano, the audio sensor may detect the sound of the piano, thereby allowing the processing unit 108 to determine the intended use of the object 102 (i.e. playing the (electric) piano) and further base the control command on the determination.

In a further embodiment the device detection unit 106 is further arranged for detecting an identification tag 118 of the object 102. In this embodiment the object 102 is equipped with an identification tag 118. The tag 118 contains information about at least one characteristic of the object 102, thereby allowing the processing unit 108 to generate a control command based on the characteristic of the object 102. Various identification methods that are known in the art may be used, for example radio frequency identification (RFID) or near field communication (NFC). A choice for an appropriate identification method may depend on: the detection range of the device detection unit 106 of the wearable device 100, internal or external placement of the tag and/or the use of active or passive tags (i.e. battery powered or not). An advantage of these radio-frequency-based methods is that they allow the user to attach a tag 118 to a device, thereby allowing the device to be detectable by device detection unit 106 of the wearable device 100. This creates an opportunity to personalize the configuration of the tags in order to create, for example, personalized tag-based control commands or user preference settings. In an exemplary embodiment the object 102 may be, for example, a stove which may be equipped with an identification tag by the user, thereby allowing the device detection unit 106 to detect the proximity of the stove. This further allows the processing unit 108 to identify the stove and to provide a control command based on this identification. The control command may, for example, comprise an 'on'-command which is sent to a ventilation hood.

In an additionally or alternative embodiment the device detection unit 106 further comprises a wireless transceiver arranged for communicating with the object 102, wherein the wireless transceiver is arranged for obtaining a characteristic of the object 102. The processing unit 108 may then generate the control command further based on the obtained characteristic of the object 102. A communication link between the object 102 and the wearable device 100 offers the further possibility to communicate user input entered on the object 102 to the wearable device 100, thereby allowing adjustment of a control parameter of the controllable device 104 to the specific user input entered. If the user enters a further user input on the same object 102, a further control command may be sent to the controllable device 104 in order to adjust the settings of the controllable device 104 to the further user input. User input entered on the object 102 may be further used to determine or estimate a specific use of the object 102 and hence it may be an advantage to adjust a setting of the controllable device 104 in anticipation of the specific use of the object 102. Various wireless communication technologies that are known in the art may be used, for example Bluetooth, Wi-Fi or ZigBee. A specific communication technology may be selected based on the communication capabilities of the object, the wearable device and controllable devices, the power consumption of the communication driver for the wireless technology and/or the communication range of the wireless signals. Many consumer object today are already equipped with one or more wireless communication technologies, which is advantageous because this may reduce the effort to create a communication link between the wearable device 100 and the controllable device 104 and the object 102.

In a further embodiment the wearable device 100 further comprises a memory 114. The memory 114 may be arranged for storing a user preference setting that may relate to, for example, a preferred reading light setting or a preferred reading background music, a preferred lighting atmosphere for watching television, etc. The memory 114 may be further arranged for storing information about one or more object 102 (e.g. the default contrast of an e-book reader, the location of a television in a room, etc.) and the control parameters of one or more controllable devices 104 (e.g. the control parameters of a lighting system, the control options of an electronic chair, etc.). The control command may be further based on the user preference setting and on information about the controllable device 104 and the object 102. An advantage of storing information about one or more objects 102 in the memory 114 of the wearable device 100 is that there is no explicit communication required with the object 102 to retrieve for example its default settings or device usage information related to a detected user (inter) action with the wearable device 100. The advantage of having information on control parameters of one or more controllable devices 104 stored in the memory 114 of the wearable device 100 is that the processing unit 108 of the wearable device 100 can determine control commands that are effectively executable by the one or more controllable devices 104, thereby avoiding communication of control commands that cannot be realized, for example avoid sending color adjustment commands to a light source than can only provide dimmed white light. User preference setting may be uploaded to the memory 114, for example via a further device (e.g. a smartphone or a pc) or via a user interface of the wearable device 100.

In a further embodiment the device detection unit 106 further comprises a camera arranged for capturing an image of at least a part of the object 102. The camera may capture the image automatically or an indication of user input (e.g. a user movement) may be used as a trigger to capture the image. The processing unit 108 may be further arranged for identifying the object 102 based on an image captured by the camera. Content-based image retrieval (CBIR) is a method known in the art, wherein visual data is derived from an image, which is compared to the visual data of a series of images from a database and, based on the keywords related to similar images, the content of the image is determined. In embodiments, the wearable device may upload the image captured by the camera to a network and CBIR may be executed on, for example, a remote server, thereby reducing the required computing power of the processing unit 108 of the wearable device 100. The device identification and/or characteristics of the object 102 may then be downloaded from the network to the wearable device 100. A further technology that may be used in combination with a camera is quick response (QR) code recognition. The object 102 may be equipped with a QR code which can be read by the camera, thereby allowing the processing unit 108 to determine a characteristic of the object 102 from the QR code. If the QR code only comprises an identification code of the object 102, the wearable device 100 may upload the identification code to a network, for example a remote server, and retrieve information on characteristics of the identified object 102 from the network. An advantage of QR codes is that they provide an opportunity to make any object detectable, simply by attaching a QR code to the device. An object 102, for example a dinner table, may be provided with QR code, thereby allowing detection by the detection unit 106 of the wearable device 100. The QR code may be configured by the user to make it identifiable by the processing unit 108, allowing the processing unit 108 to determine that the object 102 is, for example, a dinner table and to generate a control command based on the interaction with the table (e.g. a control command sent to an atmosphere creation system to create a dining atmosphere). Besides offering the possibility to upgrade non-detectable objects 102 to detectable objects 102, users may configure/create their own QR codes, print the QR codes and attach them to objects in order to create, for example, personalized control commands or preference settings from the QR code readings.

Figure 2:
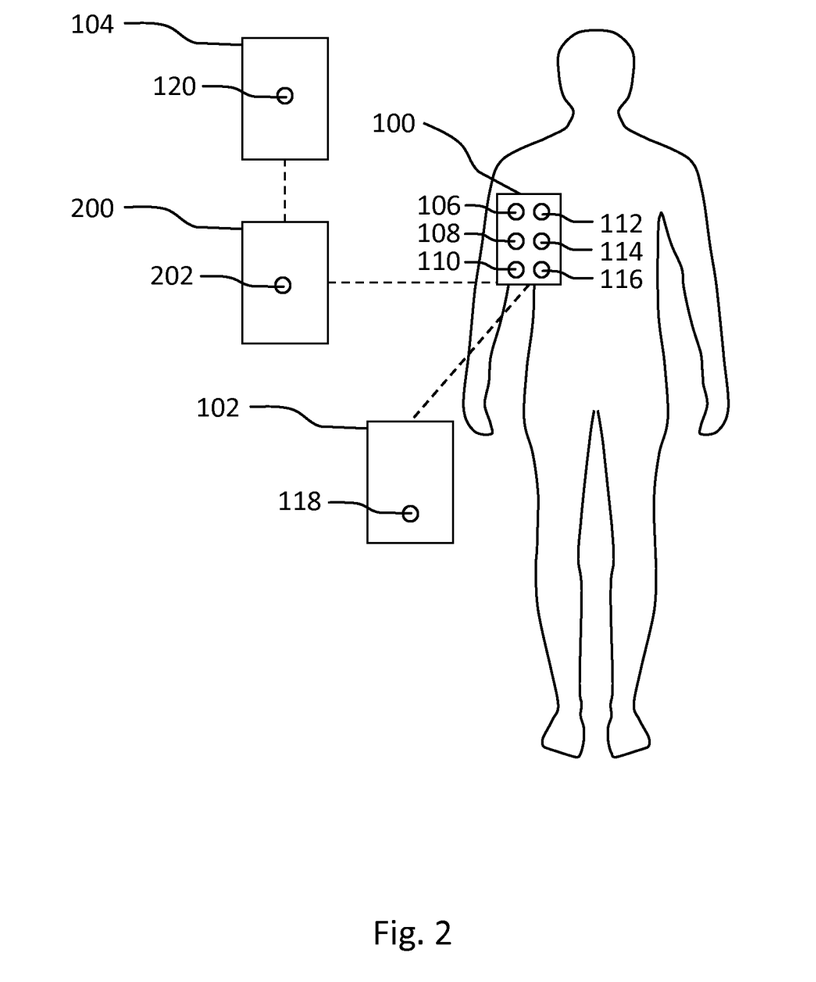
FIG. 2 shows schematically another embodiment of a wearable device according to the invention for controlling a controllable device based on an interaction with an object through an intermediate device.

In another embodiment of the wearable device 100, shown in FIG. 2, the communication unit 110 is arranged for sending the control command to the controllable device 104 through an intermediate communication device 200. The intermediate communication device 200, e.g. a bridge, may be arranged for storing a further control command and/or a further user preference setting. Therefore, the intermediate communication device 200 may comprise a transceiver 202 arranged for communicating with the wearable device 100 and the controllable device, and a memory unit (not shown) arranged for storing control commands and/or further user preference settings. The intermediate device 200 determines, based on the control command from the communication unit 110 of the wearable device 100, which control command is sent to the controllable device 104. In a further embodiment the intermediate device 200 and/or the wearable device 100 may be connected to the internet and/or to a remote server where a further control command and/or a further user preference setting are stored. The use of an intermediate communication device 200 or a remote server for storing information may reduce the computing power of the wearable device 100. The intermediate communication device 200 may be further arranged for providing a gateway to a network of controllable devices (e.g. a Philips Hue lighting network, a DALI lighting network or a home automation network). The intermediate communication device 200 may be further arranged to receive an abstract control command, wherein the intermediate communication device 200 sends one or more further control commands one or more controllable devices 104. For example, when the device detection unit 106 of the wearable device 100 identifies an interaction with a television, the processing unit 108 may generate a control command, for example 'television setting', which is received by the intermediate communication device 200 and translated to and relatively send to, for example, 'curtains closed' to a curtain control device, 'task lights off' to a lighting system and/or 'surround sound on' to a surround sound system. An advantage of the use of an intermediate communication device 200 is that the number of connection protocols of the wearable device 100 may be reduced, thereby reducing the complexity and the costs of the wearable device 100. In a further embodiment the intermediate communication device 200 may comprise a user interface for configuring the wearable device. The intermediate communication device may be, for example, a smartphone comprising a touch display that allows user input and further comprising a software application arranged for configuring the wearable device 100. The smartphone may be further arranged for connecting to one or more controllable devices 104 directly, via a local network and/or via the internet. The use of an intermediate communication device 200 with a user interface may be advantageous because it may reduce the complexity and the costs of the wearable device 100.

In a further embodiment the wearable device 100 further comprises a user interface 116 arranged for receiving a user input. The processing unit 108 may be further arranged for processing the user input received from the user via the user interface 116. The user input may for example comprise a selection and/or a confirmation of selection of the object 102 detected by the wearable device 100, thereby allowing the user to acknowledge the detection of the object 102. The user input may comprise a selection and/or a confirmation of selection of the controllable device 104, thereby allowing the user to acknowledge a connection with the controllable device 104. The user input may comprise a user preference setting for the controllable device 104. The user input may comprise an adjustment and/or a creation of a control command for the controllable device 104. The user interface 116 may comprise, for example, a touch-sensitive device, an audio sensor, a motion sensor and/or one or more buttons for receiving the user input. The touch-sensitive device may be, for example, a touchpad or a touchscreen. This touch-sensitive device and/or the one or more buttons, enable the user to perform any of the abovementioned user input actions. A further type of user input may comprise a movement of the user wearing the wearable device 100, allowing the user to provide user input via, for example, gestures, tapping and/or waving. Movement may be detected by a remote device (e.g. a camera) or it may be detected by the action detection unit 112 in the wearable device 100 (e.g. an accelerometer and/or a gyroscope). In a further embodiment the user input detected by the action detection unit 112 may offer further possibilities to send a control command to the controllable device 104 via a gesture, while the gesture is not related to the object 102 (e.g. a gesture for creating a control command for a thermostat (controllable device) for increasing the room temperature while working on a laptop (object)). In this embodiment the processing unit 108 of the wearable device 100 may comprise information about the type of controllable device 104 and about the type of object 102, thereby allowing it to determine for which device the control command is meant. A further type of user input may comprise a voice command or a further sound command (e.g. the sound of clapping hands or a sound emitted by a further device) received by an audio sensor. The audio sensor may be comprised in the wearable device 100 itself, or it may be located in a further device (e.g. a sensor network of a building management system the wearable device 100 can communicate with). The user input provided via voice commands may be combined with the user input provided via the touch-sensitive device, via the buttons and/or via movement.

In a further embodiment the wearable device 100 is further arranged for providing user feedback. In this embodiment the wearable device 100 may further comprise, for example, a vibration unit arranged for providing tangible feedback to the user, a display and/or a light source arranged for providing visual feedback to the user and/or an audio output unit for providing auditory feedback to the user. The user feedback may for example be provided when a user input is detected via the user interface 116, when an object 102 is detected by the device detection unit 106 and/or when an interaction is detected by the action detection unit 112.

In a further embodiment the user interface 116 may be adaptive to the characteristics of the controllable device 104 in terms of interpretation of user input and/or providing user information. The characteristics of the controllable device 104 may determine the operation of, for example, the touch-sensitive device, the one or more buttons, voice commands and/or movement related user input. This may result in that, for example, a movement detected by the action detection unit 112 may provide a different control command for a first type of controllable device (e.g. a luminaire) compared to a second type of controllable device (e.g. a television).

In a further embodiment the wearable device may be further arranged to be identified by a positioning system (e.g. indoor via, for example, a coded light system or an RFID trilateration system and/or outdoor via, for example, a GPS system), and wherein the control command may be further based on the location of the wearable device and therewith the user. In an exemplary embodiment the device detection unit 106 may detect the proximity of an e-reader and the processing unit may receive a signal from an indoor positioning system that the user is located in a corner of the living room, thereby generating a control command to adjust, for example, the lighting settings in the corner of the living room to create lighting conditions suitable for reading an e-book on an e-reader.

Figure 3:
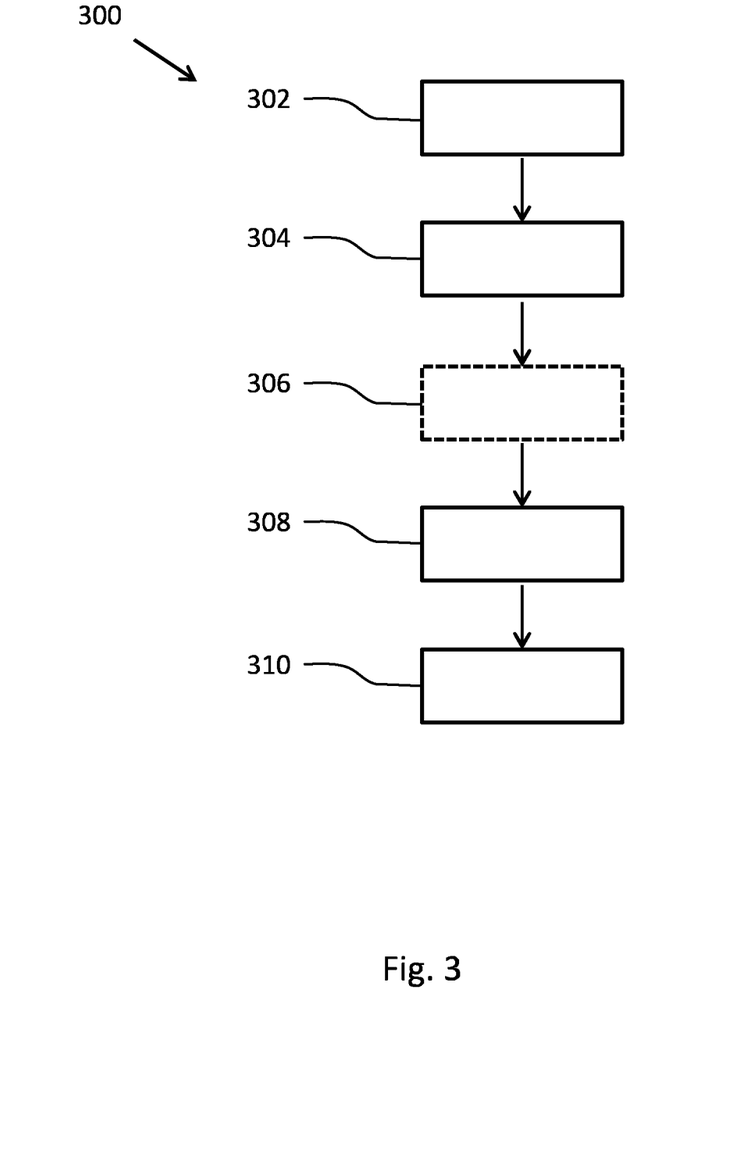
FIG. 3 shows schematically and exemplary a method of controlling a controllable device based on an interaction with an object.

FIG. 3 shows schematically and exemplary a method 300 according to the invention of controlling a controllable device 104 based on an interaction with an object 102. The method 300 comprises the following steps:

providing 302 a wearable device 100. The type of wearable device 100 (e.g. a smart ring, bracelet, watch or glasses) depends on the specific embodiment or use case.

detecting 304, by the wearable device 100, proximity of the object 102 to the wearable device 100. The detection may already include information related to the type of the object.

generating 308 a control command for controlling the controllable device 104 based on the proximity detection and the type of the object 102.

sending 310 the control command to the controllable device 104 to adjust at least one control parameter of the controllable device 104 according to the control command.

In a further embodiment the method of FIG. 3 comprises the additional step of detecting 306 an action indicative of an interaction of a user wearing the wearable device 100 with the object 102, wherein the control command is further based upon the action indicative of an interaction. As a result, the generation of the control takes into account the type or a characteristic of the object 102 in proximity of the wearable device 100 as well as any interaction of the user with the object 102.

Figure 4A:
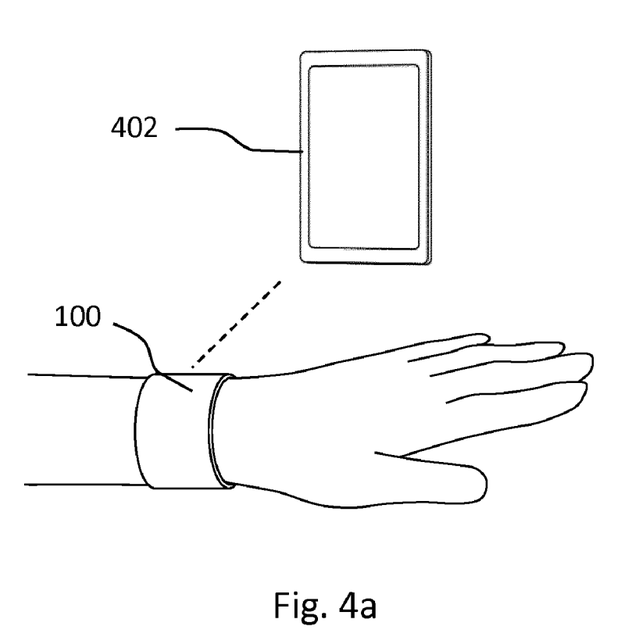
FIGS. 4a and 4b show embodiments of a set comprising a wearable device and a programming device.
Figure 4B:
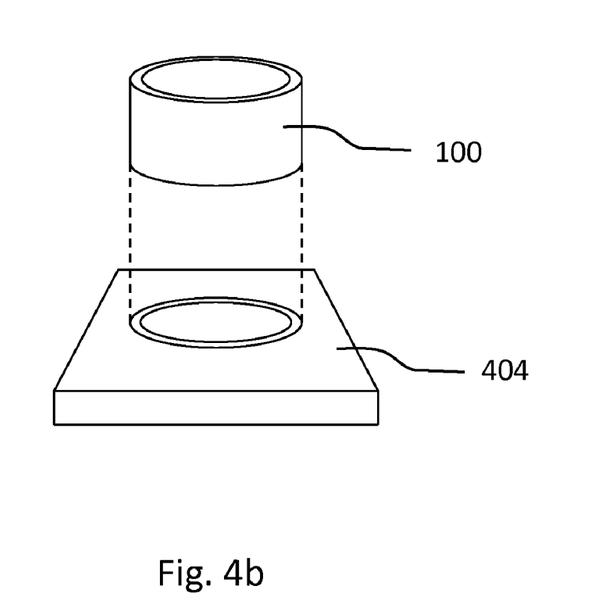

FIGS. 4a and 4b show embodiments of a set comprising a wearable device 100 (according to any of the abovementioned embodiments of the wearable device 100) and a programming device 402, 404. The programming device 402, 404 is arranged for coupling to the wearable device 100 through a wired or wireless coupling (e.g. via a wireless transceiver or a USB connection). The programming device 402, 404 may be further arranged for configuring the wearable device 100. The programming device 402, 404 may comprise an interface arranged for receiving user input, thereby allowing a user to set a user preference setting for the wearable device 100, to adjust default control commands generated by the wearable device 100 and/or to create control commands. The user preference settings and the control commands may be preconfigured for specific controllable devices 104 (according to any of the abovementioned embodiments of the controllable device 104) and objects 102 (according to any of the abovementioned embodiments of the object 102). The user preference settings and the control commands may be stored on an internal memory or an external memory (e.g. on a remote server or a remote device). An advantage of using a programming device 402, 404 to configure the wearable device 100 is that it may reduce the complexity of the wearable device 100, for example by avoiding extensive user interface hardware and software on board of the wearable device 100, thereby reducing the costs of the wearable device 100. A further advantage of a programming device 402, 404 is that it may be used to install new software on or update the software of the wearable device 100.

FIG. 4a shows an embodiment of the set, wherein the programming device 402 is an external device (e.g. a smartphone or a pc) connected through a wireless connection (e.g. Bluetooth, Wi-Fi or ZigBee). Optionally, the wearable device 100 may also be connected to the programming device through a wired connection (e.g. USB), thereby possibly providing data transfer between both devices and/or providing charging of the battery of the wearable device 100.

FIG. 4b shows an embodiment of the set, wherein the programming device 404 functions as a docking station for the wearable device 100. The docking station may provide wireless or wired data transfer between both devices and may further provide charging of the battery of the wearable device 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A wearable device for controlling a controllable device based on an interaction with an object, the wearable device comprising:
    a device detection unit for detecting proximity of the object,
    an action detection unit for detecting an action indicative of an interaction of a user wearing the wearable device with the object,
    a processing unit for generating a control command for controlling the controllable device based on the detected proximity of the object, and on the action indicative of an interaction with the object, and
    a communication unit for sending the control command to the controllable device,
    wherein the controllable device is remote from the user wearing the wearable device, and
    wherein the device detection unit is arranged for detecting an identification tag of the object, and wherein the control command is further based on an identification of the object.

2. The wearable device of claim 1, wherein the wearable device further comprises a memory for storing a user preference setting and wherein the processing unit is arranged for generating the control command for controlling the controllable device based on the user preference setting.

3. The wearable device of claim 1, wherein the communication unit is arranged for sending the control command to the controllable device through an intermediate communication device.

4. The wearable device of claim 1, wherein the wearable device further comprises a user interface arranged for receiving a user input, wherein the user input comprises at least one of:
    a selection and/or confirmation of selection of the object detected by the device detection unit and/or the action detection unit,
    a selection and/or confirmation of selection of the controllable device, a user preference setting for the controllable device, a user adjustment of the control command.

5. The wearable device of claim 4, wherein the user interface comprises at least one of the group consisting of a touch-sensitive device, an audio sensor, a motion sensor and one or more buttons for receiving the user input.

6. A wearable device for controlling a controllable device based on an interaction with an object, the wearable device comprising:

a device detection unit for detecting proximity of the object, an action detection unit for detecting an action indicative of an interaction of a user wearing the wearable device with the object, a processing unit for generating a control command for controlling the controllable device based on the detected proximity of the object, and on the action indicative of an interaction with the object, and a communication unit for sending the control command to the controllable device, wherein the controllable device is remote from the user wearing the wearable device, and wherein the device detection unit comprises a wireless transceiver arranged for communicating with the object for obtaining a characteristic of the object and/or the action indicative of an interaction of a user wearing the wearable device with the object, and wherein the control command is further based on the characteristic of the object.

7. The wearable device of claim 6, wherein the wearable device further comprises a memory for storing a user preference setting and wherein the processing unit is arranged for generating the control command for controlling the controllable device based on the user preference setting.

8. The wearable device of claim 6, wherein the communication unit is arranged for sending the control command to the controllable device through an intermediate communication device.

9. A wearable device for controlling a controllable device based on an interaction with an object, the wearable device comprising:

a device detection unit for detecting proximity of the object, an action detection unit for detecting an action indicative of an interaction of a user wearing the wearable device with the object, a processing unit for generating a control command for controlling the controllable device based on the detected proximity of the object, and on the action indicative of an interaction with the object, and a communication unit for sending the control command to the controllable device, wherein the controllable device is remote from the user wearing the wearable device, and wherein the device detection unit further comprises a camera for capturing an image of at least a part of the object and wherein the processing unit is further arranged for identifying the object based on the image.

10. The wearable device of claim 9, wherein the wearable device further comprises a memory for storing a user preference setting and wherein the processing unit is arranged for generating the control command for controlling the controllable device based on the user preference setting.

11. The wearable device of claim 9, wherein the communication unit is arranged for sending the control command to the controllable device through an intermediate communication device.

* * * * *